United States Patent
Yamaguchi et al.

(10) Patent No.: US 6,731,422 B2
(45) Date of Patent: May 4, 2004

(54) METHOD FOR FORMING A POLARIZATION-INVERSED PORTION

(75) Inventors: Shoichiro Yamaguchi, Bisai (JP); Tatsuo Kawaguchi, Hozumi-Cho (JP); Takatoshi Nehagi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 243 days.

(21) Appl. No.: 09/871,067

(22) Filed: May 31, 2001

(65) Prior Publication Data

US 2002/0005980 A1 Jan. 17, 2002

(30) Foreign Application Priority Data

Jul. 14, 2000 (JP) .................................. 2000-214540

(51) Int. Cl.[7] .............................................. G02F 1/365
(52) U.S. Cl. ...................... 359/332; 359/326; 385/122
(58) Field of Search ................... 359/326–332; 385/122; 372/21–22

(56) References Cited

U.S. PATENT DOCUMENTS

| | | | | |
|---|---|---|---|---|
| 3,944,330 A | * | 3/1976 | Tsunoda et al. ............ 349/152 |
| 4,236,785 A | * | 12/1980 | Papuchon et al. ........... 385/122 |
| 5,652,674 A | * | 7/1997 | Mizuuchi et al. ........... 359/326 |
| 6,529,309 B2 | * | 3/2003 | Mizuyoshi .................. 359/280 |

FOREIGN PATENT DOCUMENTS

| JP | 9-218431 | 8/1997 |
|---|---|---|
| JP | 11-072809 | 3/1999 |

\* cited by examiner

*Primary Examiner*—John D. Lee
(74) *Attorney, Agent, or Firm*—Burr & Brown

(57) ABSTRACT

A first electrode and a second electrode are provided in separation on a main surface of a substrate made of a ferroelectric single crystal. A first voltage is applied between the first electrode and the second electrode, for example, on condition that the first electrode is positive and the second electrode is negative, to generate and grow a first polarization-inverted portion toward the second electrode from the first electrode. Then, the distance between the first electrode and the second electrode is changed, and a second voltage is applied between the first electrode and the second electrode on the same condition, to generate and grow a second polarization-inverted portion, in a different area from that of the polarization-inverted portion, toward the second electrode from the first electrode.

12 Claims, 6 Drawing Sheets

METHOD FOR FORMING A POLARIZATION-INVERSED PORTION

BACKGROUND OF THE INVENTION

1. Field of the Invention

This invention relates to a method for forming a polarization-inverted portion such as a periodical polarization-inverted structure usable for a second harmonic wave-generation (SHG) device utilizing a Quasi-Phase-Matching (QPM) system.

2. Related Art Statement

As a blue laser-light source usable for an optical pickup, etc., a SHG device utilizing a QPM system, having an optical waveguide constructed from a periodical polarization-inverted portion in a substrate made of a ferroelectric single crystal such as a lithium-niobate single crystal or a lithium tantalate single crystal, is expected. The device may be widely used for optical disk memory, medicine, optochemical field, and various optical measurement.

In order to realize a high conversion efficiency in the SHG device, it is required that the above polarization-inverted portion is formed deeply in the ferroelectric single crystal substrate. The deeply forming method of the polarization-inverted portion is, for example, disclosed in the Kokai publication Kokai Hei 9-218431 (JPA9-218431). In the publication, a conventional voltage applying method is improved, and attempt is made to grow a polarization-inverted portion deeply from a main surface of a ferroelectric single crystal substrate by sloping the main surface thereof from the polarization axis thereof by 3 degrees.

Moreover, in the Kokai publication Kokai Hei 11-72809 (JP A 11-72809), a main surface of a ferroelectric single crystal substrate is inclined from a polarization axis of the ferroelectric single crystal substrate by 3 degrees, and a ctenoid electrode and a virgate electrode are formed on the main surface, and several low electric resistance portions are formed in between the forefronts of the ctenoid electrode and the virgate electrode. Then, when a direct current is applied between the ctenoid electrode and the virgate electrode, polarization-inverted portions are formed corresponding to the electrode pieces of the ctenoid electrode and the low electric resistance portions.

As mentioned above, the forming method of the polarization-inverted portion described in the Kokai publication Kokai Hei 11-72809 can certainly form the polarization-inverted portions corresponding to the electrode pieces of the ctenoid electrode and the low electric resistance portions. However, since a given space is placed in between the forefronts of the electrode pieces of the ctenoid electrode and the low electric resistance portions and in between the adjacent low electric resistance portions, the above polarization-inverted portions have given spaces therebetween. That is, the polarization-inverted portions are formed in separation. If a ferroelectric single crystal substrate having the above-mentioned periodical polarization-inverted portion is employed for a SHG device utilizing a QPM system, a fundamental wave interacts with only the forward polarization-inverted portions, that is, the polarization-inverted portions corresponding to the electrode pieces of the ctenoid electrode. Therefore, the conversion efficiency for a second harmonic wave may not be enhanced.

SUMMARY OF THE INVENTION

It is an object of the present invention to provide a new method for forming a polarization-inverted portion deeply from a main surface of a ferroelectric single crystal substrate having a single polarized domain.

This invention relates to a method for forming a polarization-inverted portion comprising the steps of:
preparing a substrate made of a ferroelectric single crystal,
fabricating a first electrode and a second electrode on a main surface of the substrate in separation,
applying a first voltage between the first electrode and the second electrode to generate and grow a first polarization-inverted portion toward the second electrode from the first electrode,
changing the distance between the first electrode and the second electrode, and
applying a second voltage between the first electrode and the second electrode to generate and grow a second polarization-inverted portion, in a different area from that of the first polarization-inverted portion, toward the second electrode from the first electrode.

The inventors have conceived that after some polarization-inverted portions (first polarization-inverted portions) are formed by a voltage applying method using a first electrode and a second electrode, additional polarization-inverted portions (second polarization-inverted portions) are formed in the different area by changing the distance of between the first electrode and the second electrode. The first polarization-inverted portion and the second polarization-inverted portion have their respective different depth for a main surface of a ferroelectric single crystal substrate. Therefore, if the distance between the first electrode and the second electrode is adjusted appropriately, the overlapping degree of the first polarization-inverted portion and the second polarization-inverted portion can be controlled. A conventional forming method of a polarization-inverted portion as described in the Kokai publication Kokai Hei 11-72809 can not control the overlapping degree of the polarization-inverted portions.

Herein, the "voltage applying method" means a method that a first electrode and a second electrode are provided on a main surface of a ferroelectric single crystal substrate so as to be opposed each other, and a given voltage is applied between the first electrode and the second electrode on the condition that the first electrode is positive, thereby to grow a polarization-inverted portion along the polarization axis from the first electrode. The voltage applying method is explained in the Kokai publications Kokai Hei 9-218431 and Kokai Hei 11-72809.

In a preferred embodiment of the present invention, the first electrode is constructed from a ctenoid electrode having plural strip electrode pieces, and the distance between the first electrode and the second electrode is changed by adjusting the lengths of the electrode pieces after the first polarization-inverted portion is formed. In this case, a desired periodical polarization-inverted structure can be formed easily.

The distance between the first electrode and the second electrode can be increased or decreased. In the case of increasing the distance, it is desired that a part of at least one of the first electrode and the second electrode is removed by etching treatment or dicer processing after the first polarization-inverted portion is formed. Or another first electrode or another second electrode may be formed, by conventional photolithography technique, on the main surface of the ferroelectric single crystal substrate after the above first electrode or the above second electrode is removed entirely.

Particularly, in light of the number of the processing steps for the ferroelectric single crystal substrate, the former distance-increasing method is preferable because it requires not so many processing steps. In the case of using the ctenoid electrode as the first electrode, the distance between the first electrode and the second electrode can be easily increased by shortening the electrode pieces of the ctenoid electrode through etching treatment or dicer processing.

In the case of forming the second polarization-inverted portion on the condition that the distance between the first electrode and the second electrode is increased, the electric potential of the first electrode may be set to be almost equal to that of the first electrode in the case of forming the first polarization-inverted portion. However, in this case, the second polarization-inverted portion is likely to be formed small due to the increased distance between the first electrode and the second electrode. Therefore, in order to develop the size of the first polarization-inverted portion, the electric potential of the first electrode in forming the second polarization-inverted portion is set to be larger than that of the first electrode in forming the first polarization-inverted portion.

In the case of forming the second polarization-inverted portion on the condition that the distance between the first electrode and the second electrode is decreased, the electric potential of the first electrode can be also set to be almost equal to that of the first electrode in the case of forming the first polarization-inverted portion. However, in this case, the second polarization-inverted portion is likely to be large due to the decreased distance between the first electrode and the second electrode. Therefore, in order to reduce the size of the second polarization-inverted portion, the electric potential of the first electrode in forming the second polarization-inverted portion is set to be smaller than that of the first electrode in forming the first polarization-inverted portion.

As mentioned above, the size of the first polarization-inverted portion or the second polarization-inverted portion can be controlled by adjusting the voltage between the first electrode and the second electrode even though the distance between the first electrode and the second electrode is changed.

The file of this patent contains at least one drawing or photograph executed in color. Copies of this patent with color drawing(s) or photograph(s) will be provided by the Patent and Trademark Office upon request and payment of the necessary fee.

BRIEF DESCRIPTION OF THE DRAWINGS

For a better understanding of this invention, reference is made to the attached drawings, wherein.

DETAILED DESCRIPTION OF THE INVENTION

This invention is described in detail hereinafter, with reference to the attached drawings.

Figure 1:
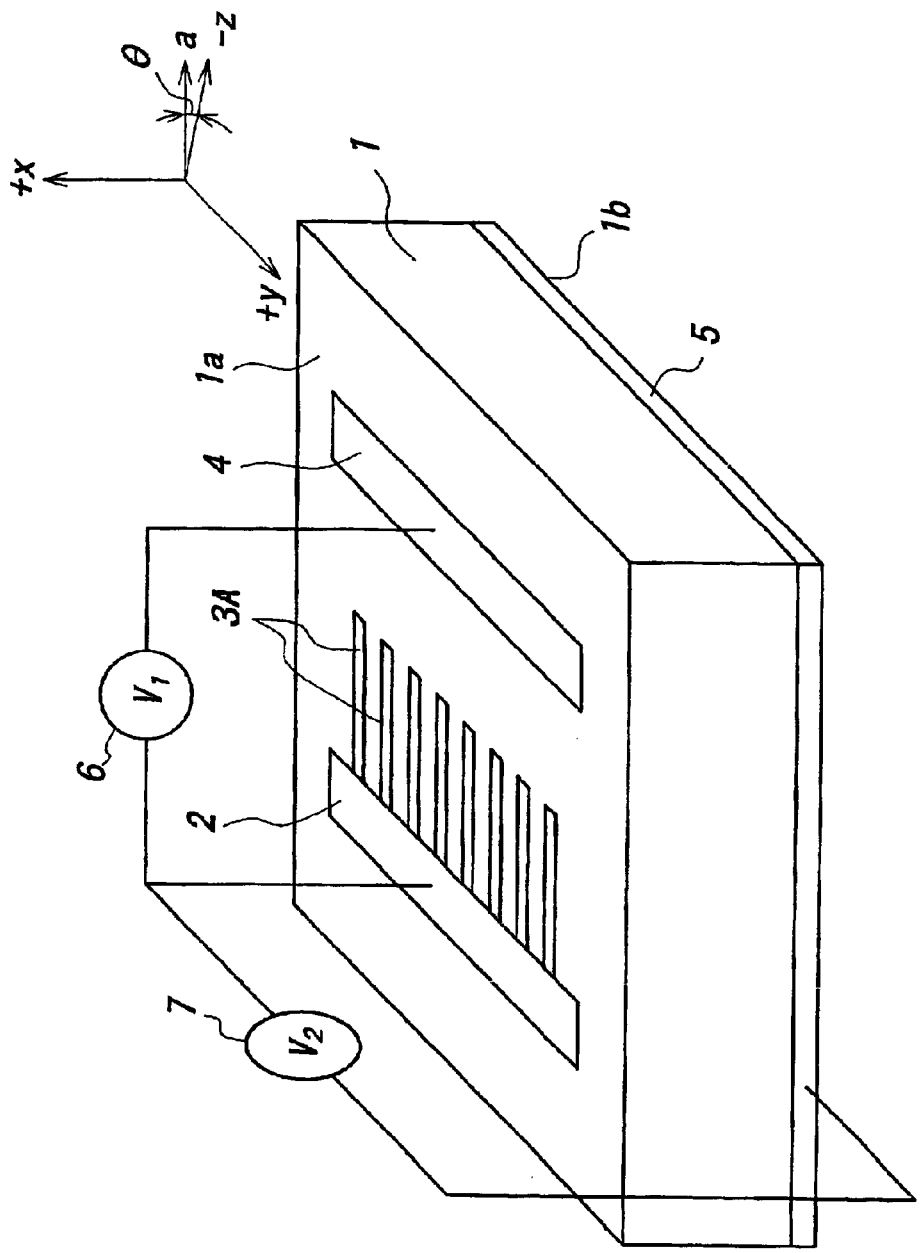
FIG. 1 is a schematic view showing an arrangement of a ferroelectric single crystal substrate, a first electrode, a second electrode and a planar electrode in the case of forming a first polarization-inverted portion.
Figure 2:
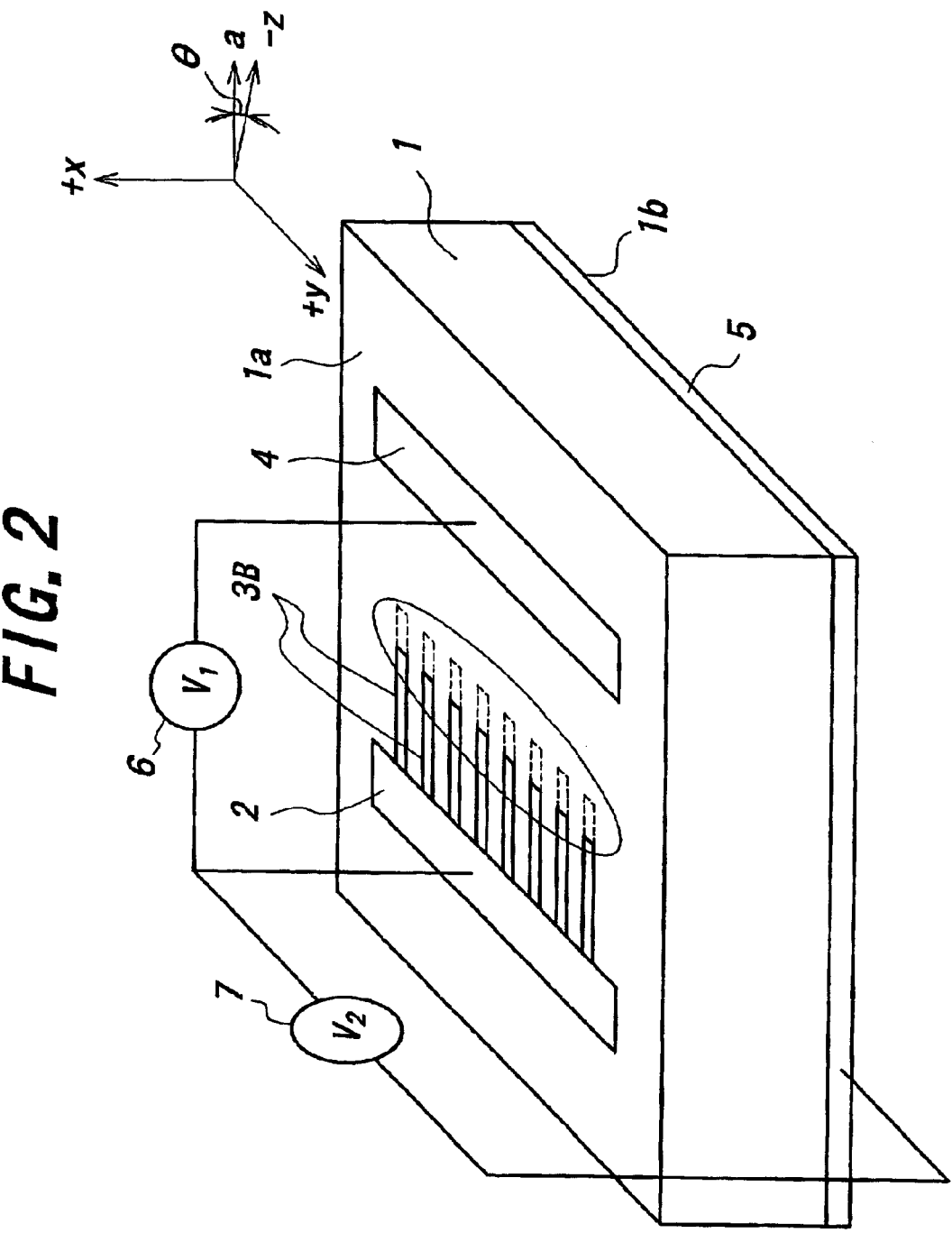
FIG. 2 is a schematic view showing an arrangement of a ferroelectric single crystal substrate, a first electrode, a second electrode and a planar electrode in the case of forming a second polarization-inverted portion.

FIG. 1 is a perspective view schematically showing an arrangement of the ferroelectric single crystal substrate, the first electrode, the second electrode and the planar electrode in forming the first polarization-inverted portion, and FIG. 2 is a perspective view schematically showing an arrangement of the ferroelectric single crystal substrate, the first electrode, the second electrode and the planar electrode in forming the second polarization-inverted portion.

A first electrode 2 and a second electrode 4 are provided on a main surface 1a of a substantially rectangular parallelepiped substrate 1 made of a ferroelectric single crystal. The first electrode 2 has a strip virgate portion and plural strip electrode pieces 3A elongating toward the second electrode 4. A planar electrode 5 is provided on the rear main surface 1b of the substrate 1. The ferroelectric single crystal constituting the substrate has a polarization axis parallel to a Z-axis, and the substrate 1 is sloped for the Z-axis by an angle θ. Then, an electric power supply 6 is provided between the first electrode 2 and the second electrode 4, and an electric power supply 7 is provided between the first electrode 2 and the planar electrode 5.

Figure 3A:
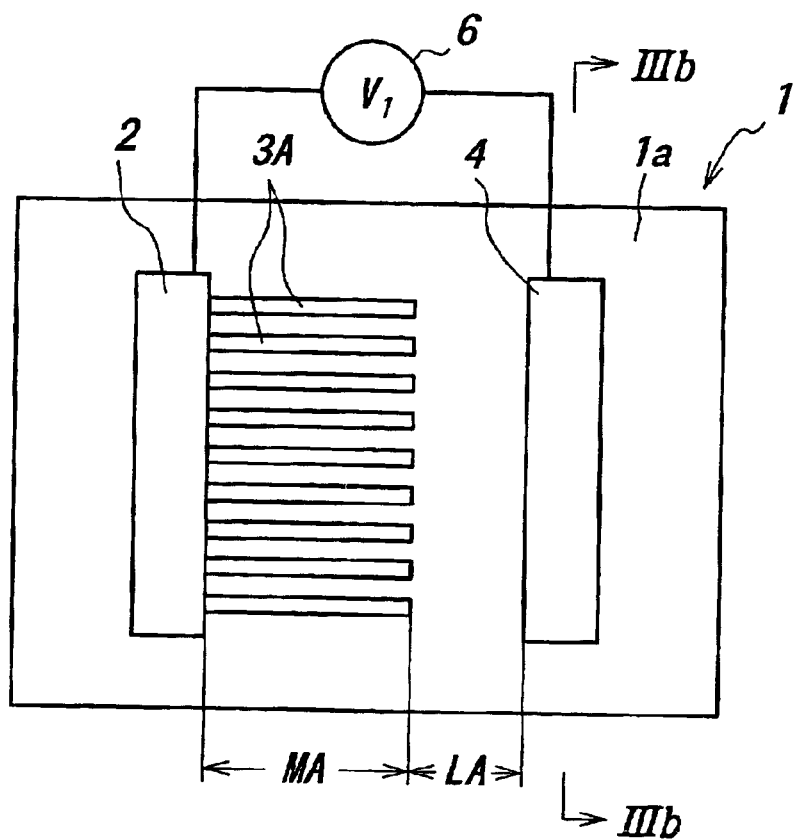
FIG. 3a is a plan view showing an arrangement of the first electrode and the second electrode in the case of forming the first polarization-inverted portion.
Figure 3B:
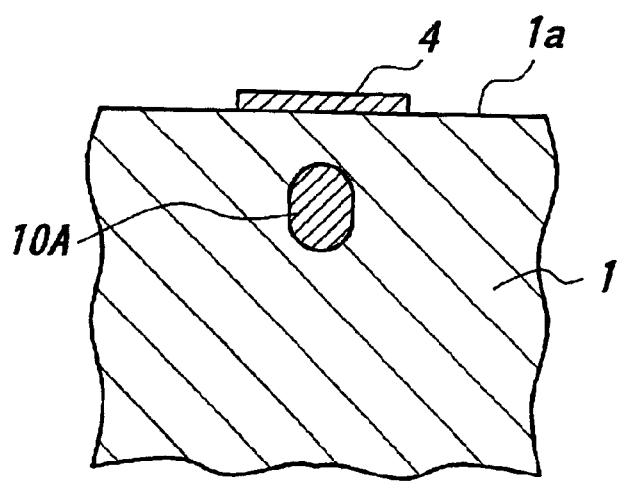
FIG. 3b is a cross sectional view taken on line IIIb—IIIb of the ferroelectric single crystal substrate schematically showing the first polarization-inverted portion.

In this case, the distance between the forefronts of the electrode pieces 3A of the first electrode 2 and the second electrode 4 is set to LA as shown in FIG. 3a. When a given voltage is applied between the first electrode and the second electrodes from the electric power supply 6 and/or 7, polarization-inverted portions are generated and grown toward the second electrode 4 from the forefronts of the electrode pieces 3A of the first electrode 2. As a result, for example, a first polarization-inverted portion 10A is formed under the second electrode 4 as shown in FIG. 3b.

Figure 4A:
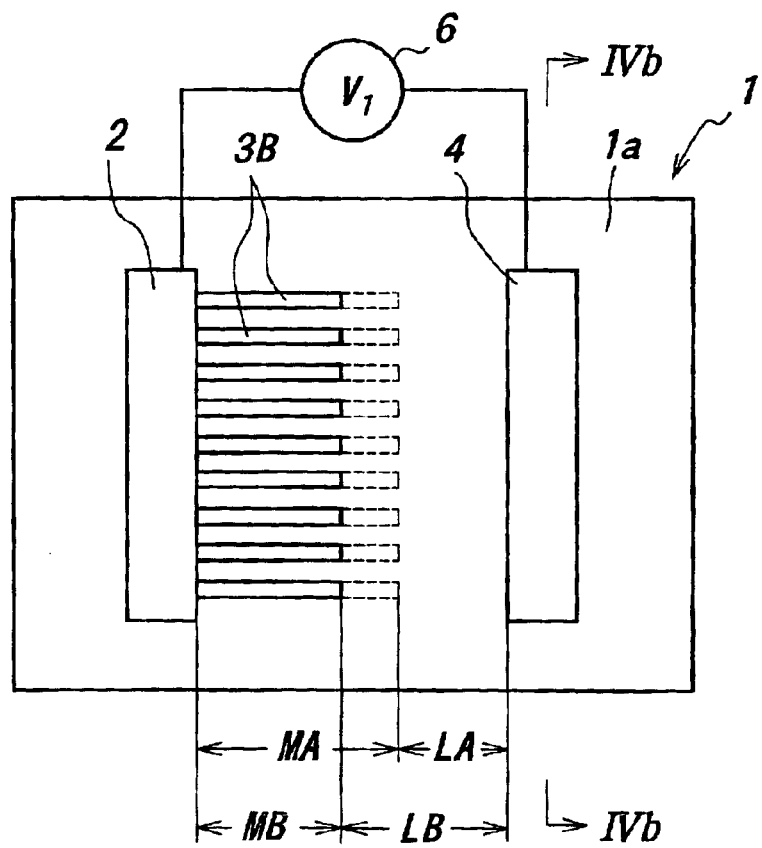
FIG. 4a is a plan view showing an arrangement of the first electrode and the second electrode in the case of forming the second polarization-inverted portion.
Figure 4B:
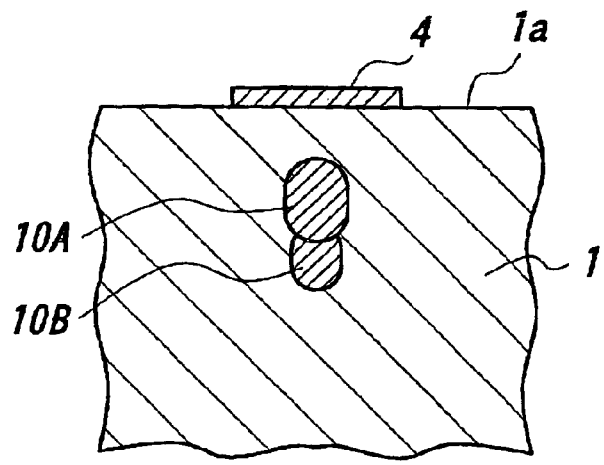
FIG. 4b is a cross sectional view taken on line IVb—IVb of the ferroelectric single crystal substrate schematically showing the first polarization-inverted portion and the second polarization-inverted portion.
Figure 5:
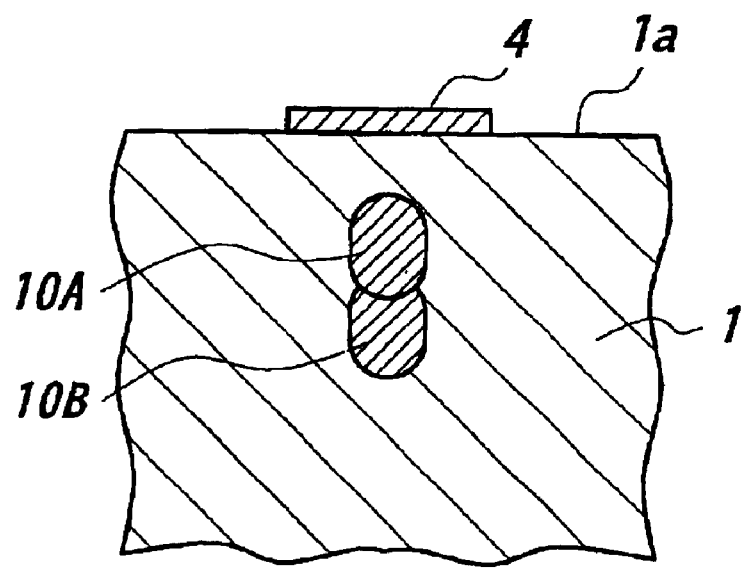
FIG. 5 is cross sectional view schematically showing the first polarization-inverted portion and another second polarization-inverted portion.

Subsequently, as shown in FIGS. 2 and 4a, the forefronts of the electrode pieces 3A are removed and shortened, and the distance between the forefronts of the electrode pieces 3B of the first electrode 2 and the second electrode 4 is set to LB larger than the distance LA. When a given voltage is applied between the first electrode 2 and the second electrode 4 from the electric power supply 6 and/or 7, polarization-inverted portions are generated and grown toward the second electrode 4 from the forefronts of the shortened electrode pieces 3B of the first electrode 2. As a result, for example, a second polarization-inverted portion 10B is formed under the second electrode 4 as shown in FIG. 4b.

In this case, if almost the same voltage is given between the first electrode and the second electrode in forming the first polarization-inverted portion and the second polarization-inverted portion, the size of the second polarization-inverted portion is likely to be smaller than that of the first polarization-inverted portion. If a voltage to be applied to between the first electrode and the second electrode in forming the second polarization-inverted portion is set to be larger than that in forming the first polarization-inverted portion, the second polarization-inverted portion may have a size almost equal to or larger than that of the first polarization-inverted portion.

The given voltage to be applied to between the first electrode and the second electrode is normally set to 1.5–5.0 kV. In the case of using a different voltage in forming the second polarization-inverted portion, the voltage ratio is preferably set to 1.1 times or over.

Moreover, the pulse frequency of the voltage to be applied to between the first electrode and the second electrode may be changed. In this case, the difference in pulse frequencies in forming the first polarization-inverted portion and the second polarization-inverted portion is preferably set to 10% or over.

Moreover, the distance ratio (LB/LA) is preferably set to 1.25 or below. Thereby, the first polarization-inverted portion and the second polarization-inverted portion are easily combined each other. Then, the distance ratio (LB/LA) is preferably set to 1.05 or over.

Then, for example, another first electrode may be fabricated after the first electrode 2 may be removed, thereby to set the distance LA to be larger than distance LB. In this case, the distance ratio (LA/LB) is preferably set to within 1.05–1.25.

In the case that the distance LB is set to be larger than the distance LA using, as the first electrode, the ctenoid electrode having the removed electrode pieces as shown in FIGS. 2 and 4a, the length MA of the electrode pieces 3A of the ctenoid electrode is larger than the length MB of the removed electrode pieces 3B of the ctenoid electrode. The length ratio (MB/MA) is preferably set to 0.7 or over. Thereby, the first polarization-inverted portion and the second polarization-inverted portion can be easily combined. Moreover, in order to effectively and easily form the second polarization-inverted portion in a different position from that of the first polarization-inverted portion, the length ratio (MB/MA) is preferably set to 0.9 or over.

In the case that the distance LB is set to be smaller than the distance LA, for example using the another first ctenoid electrode having the longer electrode pieces as mentioned above, the length MA of the electrode pieces 3A of the ctenoid electrode is smaller than the length MB of the removed electrode pieces 3B of the ctenoid electrode. The length ratio (MA/MB) is preferably set to within 0.7–0.9.

If the above process is repeated, many polarization-inverted portions such as a third polarization-inverted portion and a fourth polarization-inverted portion can be made.

In this invention, the substrate 1 may be made of a ferroelectric single crystal such as lithium niobate ($LiNbO_3$), lithium tantalate ($LiTaO_3$), potassium lithium tantalate ($K_3Li_2Nb_5O_{15}$), lithium niobate-lithium tantalate ($LiNb_{1-X}Ta_XO_3$(0<X<1)) or the like. Particularly, the substrate 1 may be preferably made of lithium niobate, lithium tantalate or lithium niobate-lithium tantalate because they have their well known polarization-inverted properties.

In order to develop optical damage-resistance of the substrate, the above ferroelectric single crystal may incorporate at least one element selected from the group consisting of magnesium (Mg), zinc (Zn), scandium (Sc), indium (in) or at least one oxide of the respective oxides of the above mentioned metal elements. Moreover, the ferroelectric single crystal may incorporate at least one element from a lanthanide series such as neodymium (Nd), erbium (Er), thulium (Tm), holmium (Ho), dysprosium (Dy), praseodymium (Pr).

The substrate 1 may have any shape, but preferably have a planar shape.

It is not required that the main surface 1 a of the substrate 1 is inclined for the polarization axis thereof, but may be inclined by 0.2–80 degrees, particularly 0.2–45 degrees. In fabricating a SHG device using QPM system from the substrate, the inclination angle θ is preferably set to within 0.2–10 degrees. As a result, a second harmonic wave having a TE mode polarization can travel into the SHG device easily.

Moreover, the above given voltage may be applied to between the first electrode 2 and second electrode 4 from the electric power supply 6 on condition that the second electrode 4 is negative. Moreover, the above given voltage may be applied to between the first electrode 2 and the second electrode 4 on condition that the planar electrode 5 is negative. Then, the above given voltage may be applied to between the first electrode 2 and the second electrode 4 on condition that the second electrode 4 and the planar electrode 5 are negative.

EXAMPLES

Example 1

Following the above process as shown in FIGS. 1–4, the first polarization-inverted portion 10A and the second polarization-inverted portion 10B were formed. Concretely, the substrate 1 was fabricated in a size of 3 inch diameter× 1.0 mm thickness from 5 atomic % Mg doped lithium niobate single crystal. Then, the electrodes 2, 4 and 5 were fabricated of Ta by a photolithography method. The pitch of the electrode pieces 3A was set to 3 $\mu$m for generating a SHG light having a wavelength around 400 nm. The length MA of the electrode pieces 3A was set to 100 $\mu$m. The distance LA between the electrode pieces 3A of the first electrode 2 and the second electrode 4 was set to 400 $\mu$m.

A pulsed voltage of 4.0 kV with a pulse width of 20 msec, a frequency of 25 Hz, a pulse number of 6 and a upper limit current value of 2 mA was applied to between the first electrode 2 and the second electrode 4 from the electric power supplies 6 and 7, to form a periodical polarization-inverted portion having a depth of 1.5 $\mu$m along the polarization axis of the substrate 1.

Thereafter, the forefronts of the electrode pieces 3A of the first electrode 2 were removed by etching treatment to form the removed electrode pieces 3B having a length of 75 $\mu$m. Next, the second polarization-inverted portion was formed as above.

Figure 6:
FIG. 6 is a photograph showing a first polarization-inverted portion and a second polarization-inverted portion in a ferroelectric single crystal substrate.

The substrate 1 was cut off on a surface perpendicular to the polarizing direction of the substrate 1 (Z-direction) and was polished. The section of the substrate 1 was etched by a mixed solution of hydrofluoric acid and nitric acid, and was photographed as shown in FIG. 6. As is apparent from FIG. 6, the periodical polarization-inverted portion has a rectangular shape of a width of 1.9 $\mu$m and a depth of 2.2 $\mu$m.

Example 2

Except that the length MB of the removed electrode pieces 3B of the first electrode 2 was set to 50 $\mu$m through etching treatment, the first polarization-inverted portion and the second polarization-inverted portion were formed by the same manner as in Example 1. The substrate 1 was cut off, etched and photographed as shown in FIG. 7, as in Example 1, in order to investigate the condition of the thus obtained periodical polarization-inverted portion.

Figure 7:
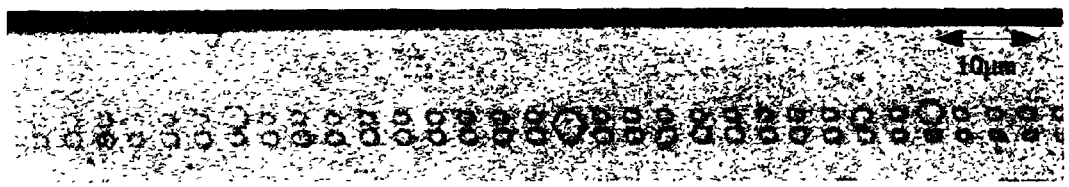
FIG. 7 is a photograph showing a first polarization-inverted portion and a second polarization-inverted portion in a ferroelectric single crystal substrate.

As is apparent from FIG. 7, the first polarization-inverted portion and the second polarization-inverted portion were formed in separation, the second polarization-inverted portion was formed in a deeper area in the substrate 1.

Although the present invention was described in detail with reference to the above examples, this invention is not limited to the above disclosure and every kind of variation and modification may be made without departing from the scope of the present invention.

As mentioned above, a new method for forming a polarization-inverted portion deeply from a main surface of a ferroelectric single crystal substrate having a single polarized domain can be provided.

What is claimed is:

1. A method for forming a polarization-inverted portion comprising the steps of:

preparing a substrate made of a ferroelectric single crystal, fabricating a first electrode and a second electrode on a main surface of the substrate in separation, applying a first voltage between the first electrode and the second electrode to generate and grow a first polarization-inverted portion toward the second electrode from the first electrode, changing the distance between the first electrode and the second electrode, and applying a second voltage between the first electrode and the second electrode to generate and grow a second polarization-inverted portion, in a different area from that of the first polarization-inverted portion, toward the second electrode from the first electrode.

2. A method for forming a polarization-inverted portion as defined in claim 1, wherein the distance between the first electrode and the second electrode is widened.

3. A method for forming a polarization-inverted portion as defined in claim 1, wherein the distance between the first electrode and the second electrode is shortened.

4. A method for forming a polarization-inverted portion as defined in claim 1, wherein the first electrode is composed of a ctenoid electrode having plural strip electrode pieces, and the distance between the first electrode and the second electrode is controlled through the adjustment of the lengths of the electrode pieces of the first electrode.

5. A method for forming a polarization-inverted portion as defined in claim 1, wherein the second voltage is adjusted in the formation of the second polarization-inverted portion, thereby to control the size of the second polarization-inverted portion.

6. A method for forming a polarization-inverted portion as defined in claim 5, wherein the second voltage is set to be larger than the first voltage.

7. A method for forming a polarization-inverted portion as defined in claim 5, wherein the second voltage is set to be smaller than the first voltage.

8. A method for forming a polarization-inverted portion as defined in claim 1, wherein the first electrode is positive and the second electrode is negative.

9. A method for forming a polarization-inverted portion as defined in claim 1, wherein a positive potential is applied to the first electrode and a planar electrode, provide on the rear surface of the substrate and connected with the first electrode is set to be negative.

10. A method for forming a polarization-inverted portion as defined in claim 1, wherein a polarization axis of the substrate is inclined from a direction parallel to the main surface.

11. A method for forming a polarization-inverted portion as defined in claim 10, wherein the inclination angle is set to within 0.2–10 degrees.

12. A method for forming a polarization-inverted portion as defined in claim 1, wherein plural first polarization-inverted portions and plural second polarization-inverted portions are formed to constitute a periodical polarization-inverted structure.

* * * * *